United States Patent

[11] 3,625,456

[72] Inventor Frederick E. Hankins
Flemington, N.J.

[21] Appl. No. 45,768
[22] Filed June 12, 1970
[45] Patented Dec. 7, 1971

[73] Assignee Lockheed Aircraft Corporation
Burbank, Calif.

[54] TEMPERATURE-COMPENSATED TAPE RECORDER DRIVE DIFFERENTIAL
10 Claims, 2 Drawing Figs.

[52] U.S. Cl. .......... 242/192, 226/195
[51] Int. Cl. .......... G03b 1/04
[50] Field of Search .......... 226/108, 111, 195, 188, 190; 242/192

[56] References Cited

UNITED STATES PATENTS

| | | | |
|---|---|---|---|
| 3,191,834 | 6/1965 | Nakauchi | 226/38 |
| 3,219,246 | 11/1965 | Kihara | 226/195 X |
| 3,282,486 | 11/1966 | De Moss | 226/190 X |
| 3,447,729 | 6/1969 | Cass | 226/195 X |
| 3,305,186 | 2/1967 | Burdoff et al. | 242/192 |
| 3,367,593 | 2/1968 | Grant | 242/192 |

*Primary Examiner*—Allen N. Knowles
*Attorneys*—George C. Sullivan and Neil J. Falley

ABSTRACT: The capstans or the driving pulleys of a magnetic tape recorder are made of different materials having different coefficients of thermal expansion, so that their effective diameters will change at different rates with temperature changes, in a direction to increase the speed differential with increasing temperature at a rate sufficient to compensate for the decrease in tensile modulus of the polyester tape backing. The effect achieved is a reduction of the peripheral speed of the slow capstan of a tape recorder with respect to the peripheral speed of the fast capstan with increasing temperatures.

FREDERICK E. HANKINS
*INVENTOR.*

*BY* George Sullivan
Agent

Neil J. Falley
Attorney

TEMPERATURE-COMPENSATED TAPE RECORDER DRIVE DIFFERENTIAL

BACKGROUND OF THE INVENTION

In magnetic tape recorders of instrumentation quality, it is necessary to maintain constant tension in the magnetic tape as it passes over the recording and playback heads. In recorders exposed to a wide range of temperatures, this is made difficult by the fact that the tensile modulus of polyester films, such as Mylar (the magnetic tape base material), decreases with increasing temperature at a near linear rate. The present invention has for its objective the provision of a simplified, economical and always reliable means to compensate for this phenomenon which would otherwise decrease the tape tension at the region of the recording and playback heads.

In the prior art, the necessary tension in the tape is normally developed by a speed differential between two capstans which transport the tape across the heads, the capstan pulling the tape into the region of the heads being operated at a slightly slower rate than the capstan pulling the tape away from the heads, actual slippage of the tape against the capstan taking place. The speed differential may be generated by having the two capstans of different diameters but driven at the same speed, or by having the two capstans of equal diameters and driven at different speeds. Known mechanical arrangements for establishing a differential drive to maintain tape tension across the heads of a recorder are generally not capable of maintaining constant tape tension, as required, in situations where the recorder is subjected to drastic temperature changes.

The heart of the present invention resides in the simple concept of making the capstans, or their driving pulleys, or both, from different materials having different rates of expansion and contraction responsive to temperature changes so that the effective diameters of the capstans and/or pulleys will change automatically with changes in temperature in such a way that the required differential drive will always be maintained. There will be an increase in the speed differential with increasing temperature at a rate sufficient to compensate for the decrease in tensile modulus of the tape. In effect, a reduction in the peripheral speed of the slow capstan of the tape recorder with respect to the peripheral speed of the fast capstan with increasing temperatures will always be maintained automatically. The necessity for mechanical gearing or moving linkages, clutches, brakes, and mechanical tape tensioning means is entirely eliminated with a resulting increase in reliability of the drive under all temperature conditions and a decrease in the cost of manufacture.

Other features and advantages of the invention will be apparent during the course of the following description.

BRIEF DESCRIPTION OF DRAWING FIGURES

DETAILED DESCRIPTION

Figure 1:
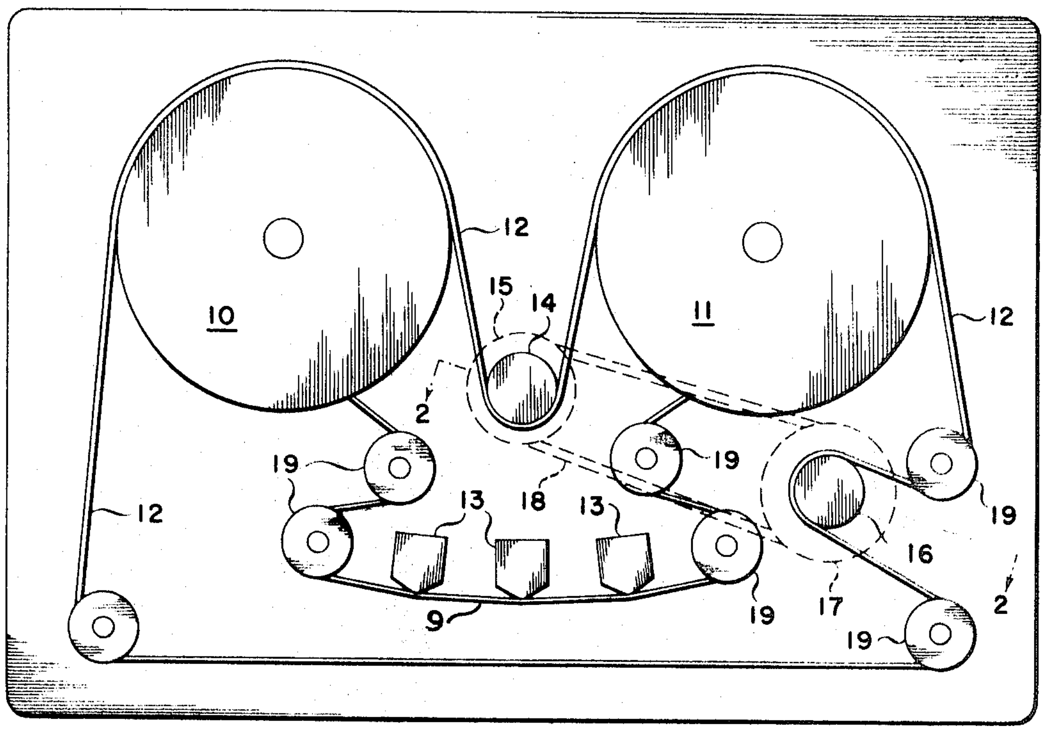
FIG. 1 is a schematic plan view of a tape recorder drive differential embodying the invention.

Referring to the drawings, wherein like numerals designate like parts, the numerals 10 and 11 designate magnetic tape reels mounted for rotation in a conventional manner and upon which the Mylar base magnetic tape 9 is wound for transportation across the recording or playback heads 13 of the recorder. A drive tape is driven in the path shown in FIG. 1, which is a typical path, by a fast capstan 14 having a drive pulley 15 associated therewith and a coacting slow capstan 16 having a drive pulley 17. The two pulleys are drivingly interconnected by a conventional coupling belt 18. A number of idlers 19 engage the magnetic tape at predetermined points in the system so as to establish the desired drive path in relation to the heads 13 and the tape reels. The configuration shown in the drawings is illustrative only and the present invention is not limited to a particular tape recorder drive configuration but is applicable to any tape recorder drive. The fast capstan 14 serves to transport the tape away from the heads 13 while the slow capstan 16 pulls the tape into the region of the heads via the drive tape.

Figure 2:
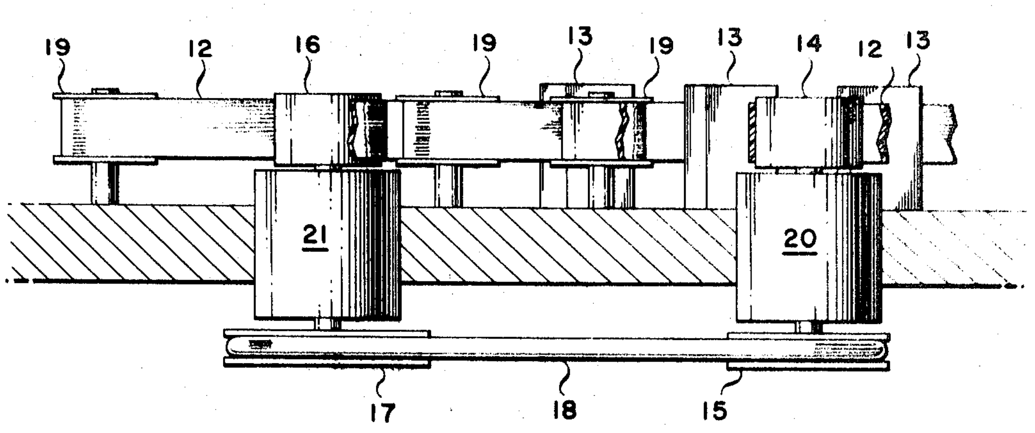
FIG. 2 is a schematic side elevational view of the same.

FIG. 2 shows the system schematically in side elevation and the bearing modules 20 and 21 for the fast and slow capstans 14 and 16 and their associated drive pulleys 15 and 17 are illustrated.

Because polyester films, such as DuPont Mylar 100A, used as the base for the magnetic recording tape 9 exhibit a near linear reduction in tensile modulus with increasing temperature, it is desirable to cancel this effect or phenomenon so as to maintain constant magnetic tape tension in the region of the recording or playback heads 13 of the magnetic tape recorder, which recorder employs a difference in the speeds of the two capstans to establish tape tension.

A means to effect such temperature compensation to maintain constant tape tension consistently across the heads 13 comprises the following, Referring to the drawings, the peripheral velocity of the fast capstan shaft 14 is caused to be greater than the peripheral velocity of the slow capstan shaft 16 by 0.1–2 percent. This is generally effected by having the belt driven pulley 17 of the slow capstan larger in diameter than the corresponding pulley 15 of the fast capstan, or by having equal pulley diameters and having the fast capstan shaft diameter slightly (0.1–2 percent) larger than the slow capstan shaft diameter, or a combination of both.

With allowances for slip, the tension in the magnetic tape is established by the difference in speeds.

$$\text{Stress} = F/A = E \cdot \epsilon$$

$$F/A = (E)\ \delta/L$$

$$\frac{F}{A} = E\frac{V\ \text{fast} - V\ \text{slow}}{V\ \text{slow}} \approx E\frac{\omega(D_1 - D_2)}{\omega(D_2)}$$

wherein:

$F$ = Tensile force on tape — oz. or lbs.
$A$ = Area of tape cross section — sq. in.
$E$ = Tensile Modulus of Mylar — lbs./in.$^2$
$\epsilon$ = Percent elongation (change of length per unit length) $\delta/l$
$V$ = Peripheral velocity of a capstan (or pulley)
$\omega$ = Angular velocity of capstans — radians/second Thus, to preserve $F/A$, a constant when the tensile modulus varies as much as 16⅔ percent between 20° and 75° C., it is desirable to increase $(V_{fast}-V_{slow})/V_{slow}$ or $(D_1-D_2)/D_2$ but since $(D_1-D_2)/D_2 \approx 0.1$ to 2 percent (20° C.) and is required to become 0.116 or 2.33 percent linearly, the variation of differential may be accomplished using the small differences of dimensions obtainable by employing drive pulleys or capstans, or both, formed of materials that have different coefficients of thermal expansion. For example, aluminum exhibits a coefficient of thermal expansion of $14\times10^{-6}$ in/in/° C. Stainless steel, on the other hand, exhibits a coefficient of thermal expansion in the range of 6 to $9\times10^{-6}$ in/in/° C. As may be required in practice, softer materials such as aluminum may be hard faced or supplied with a hard-surfaced ring shrunk thereon. Other materials exhibiting a similar difference in coefficient of thermal expansion may possibly be employed for the capstan shafts or pulleys but aluminum and stainless steel are favorable materials for the purposes of the invention to build in to the tape drive the desired temperature-compensated differential action which will maintain a constant tension on the Mylar tape across the heads 13 through a wide range of temperature variation.

The invention therefore compensates automatically for variations in the tensile modulus of the Mylar magnetic tape in accordance with temperature changes by simply utilizing appropriate materials with different coefficients of thermal expansion for the capstan drive pulleys and/or the capstan shafts and this constitutes the sum and substance of the invention.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A temperature-compensated tape recorder drive differential for a tape recorder which utilizes a magnetic tape whose tensile modulus decreases at a rapid rate with increasing temperature, said tape recorder including fast and slow rotating drive tape-engaging friction drive means to establish a drive differential and to normally maintain the magnetic tape tensioned, and means for maintaining the tension of the magnetic tape constant over a range of temperatures within which the tape recorder must operate, said means comprising elements of said fast and slow rotating friction drive means formed of materials having different coefficients of thermal expansion, whereby the effective diameters of said drive means and their corresponding peripheral speeds will be altered sufficiently in response to changes in temperature to compensate for variations in the tensile modulus of the magnetic tape, thereby maintaining constant tension on said tape.

2. The structure as defined in claim 1, and wherein said fast and slow rotating friction drive means comprises a pair of capstans each having a drive pulley, and said elements formed of materials having different coefficients of thermal expansion being the capstans and/or drive pulleys.

3. The structure as defined in claim 1, and said materials having different coefficients of thermal expansion comprising two different metals.

4. The structure as defined in claim 3, and said metals being aluminum and steel.

5. In a tape recorder drive having plural rotary drive tape-engaging drive elements, means forming a temperature-compensated differential for said drive, said means consisting of individual rotary drive tape-engaging drive elements being formed at least in part of materials having different coefficients of thermal expansion so that their effective diameters will change at different rates in response to changes in temperature and in sufficient degree to compensate for changes in tensile modulus of the tape in response to said temperature changes.

6. The structure as defined in claim 5, and said tape utilized in the tape recorder being Mylar, and said materials being aluminum and steel.

7. In an instrumentation quality magnetic tape recorder employing a Mylar base magnetic tape whose tensile modulus decreases at a near linear rate with increasing temperature, a pair of tape reels, fast and slow rotating capstan drive units engaging a drive tape to transport the same and to maintain the tape tension, and temperature-compensated means to maintain the tension on the tape constant over a range of temperatures in which the recorder must operate including said capstan drive units formed at least in part of dissimilar materials having substantially different rates of thermal expansion and contraction over said temperature range and in sufficient degree to compensate for changes in the tensile modulus of said magnetic tape.

8. The structure as defined in claim 7, wherein each capstan drive unit embodies a capstan shaft and a drive pulley, and said temperature-compensated means comprising forming the capstan shafts or drive pulleys or a combination of each from dissimilar having said different rates of said thermal expansion and contraction.

9. The structure as defined in claim 7, wherein each capstan drive unit includes a capstan shaft and a drive pulley, and said temperature-compensated means comprising forming the drive pulleys at least in part of metals having substantially different rates of thermal expansion and contraction.

10. The structure as defined in claim 9, wherein said metals are aluminum and steel.

* * * * *